INVENTOR.
John M. Hughes
BY David M. Schiller
ATTORNEY

INVENTOR.
JOHN M. HUGHES
BY David M. Schiller
ATTORNEY

May 13, 1969  J. M. HUGHES  3,443,575
FLUIDIC CONTROL SYSTEM
Filed Aug. 30, 1966  Sheet 3 of 3

INVENTOR.
JOHN M. HUGHES
BY David M. Schiller
ATTORNEY

United States Patent Office 3,443,575
Patented May 13, 1969

3,443,575
FLUIDIC CONTROL SYSTEM
John M. Hughes, Champaign, Ill., assignor to General
Electric Company, a corporation of New York
Filed Aug. 30, 1966, Ser. No. 576,134
Int. Cl. F16c 1/08, 1/14
U.S. Cl. 137—81.5                                 10 Claims

ABSTRACT OF THE DISCLOSURE

A fluidic control system for effecting a controlling function includes a pair of actuable control means each controlling the supply of fluid from a pressure fluid source to a separate pair of fluid conducting paths. Each pair of paths is connected in parallel between its associated control means and a pair of input passages of an associated AND fluid device having also a pair of output passages. One path of each pair of paths includes fluid time delay means such that a first input passage of each of the associated AND devices receives fluid prior to arrival of fluid at the second input passage to provide fluid at a first output passage of each AND device in response to substantially simultaneous actuation of the assocated control means. A third AND fluid device has its two input passages connected respectively to the first output passages of the first and second AND devices. When the two control means are actuated substantially simultaneously, fluid appears at both input passages of the third AND device and is directed to a selected one of its output passages. Additional control means is connected to such selected output passage responsive to the output fluid for effecting a controlling function.

This invention relates to fluidic control devices and has particular relation to a fluidic safety control system for controlling operation of a machine.

Fluid amplifiers are currently finding wide application in various fields, such as in control systems for machines, due primarily to their temperature in sensitivity and shock-resistance and the ready availability of suitable fluids such as air. In certain machine control applications it is desirable to provide a control system which requires simultaneous use of both hands of an operator to actuate the control system for initiating operation of the controlled machine. This is a very desirable safety feature in that both hands of the operator are occupied in starting the controlled machine which minimizes the possibility of injury to the operator which might occur if one or both hands were free during the start up operation.

It is therefore an object of the present invention to provide a novel and improved fluidic control system having desirable safety features.

It is another object of the invention to provide a novel and improved fluidic control system which requires for its actuation simultaneous use of both hands of an operator.

It is a further object of the invention to provide a novel and improved fluidic control system having provision for automatically terminating operation of the controlled device a predetermined time after its operation is initiated.

In carrying out the invention in one preferred form a fluidic control system is provided including a pair of manually actuatable means each of which controls the supply of fluid, such as air, from the pressure fluid source to a pair of parallel fluid conducting paths. Each pair of paths is connected between its associated control means and a pair of input passages of an associated fluid amplifier having also a pair of output passages. One path of each pair of paths includes fluid time delay means such that a first input passage of each of the fluid amplifiers receives fluid prior to arrival of fluid at the second input passage in response to simultaneous actuation of the associated control means. Each of the fluid amplifiers is designed to provide fluid at a first of its output passages when fluid appears at either one but not both of its input passages, and to provide fluid at the second of its output passages when fluid appears at both of its input passages. A third fluid amplifier is also provided having the same design as the two aforementioned amplifiers and its two input passages are connected respectively to the first output passages of the aforementioned two amplifiers. Therefore, when the two control means are actuated simultaneously, fluid appears at both input passages of the third amplifier and is directed to a selected one of the ouput passages of the third amplifier. Such selected output passage is connected to additional control means responsive to the output fluid for effecting desired controlling functions.

Such additional control means may comprise for example, a fourth fluid amplifier of the boundary layer type which exhibits lock-on characteristics and which includes a power nozzle, a pair of output passages for intercepting a power stream emanating from the nozzle, and a pair of control passages, one of which is connected to the selected one of the output passages of the third fluid amplifier. The output of the fourth amplifier may be applied to an input of still another fluid amplifier whose output is applied to a suitable valve which controls operation of a piston employed for example to engage and disengage a clutch for controlling operation of an associated machine. Means are provided to apply a signal to the other control passage of the fourth amplifier after the clutch is engaged to effect disengagement of the clutch.

Other objects and advantages of the invention will become apparent from the following description taken in conjunction with the accompanying drawings in which:

FIGURE 1 is a schematic diagram illustrating a fluidic control system for a machine or the like.

Figure 1:
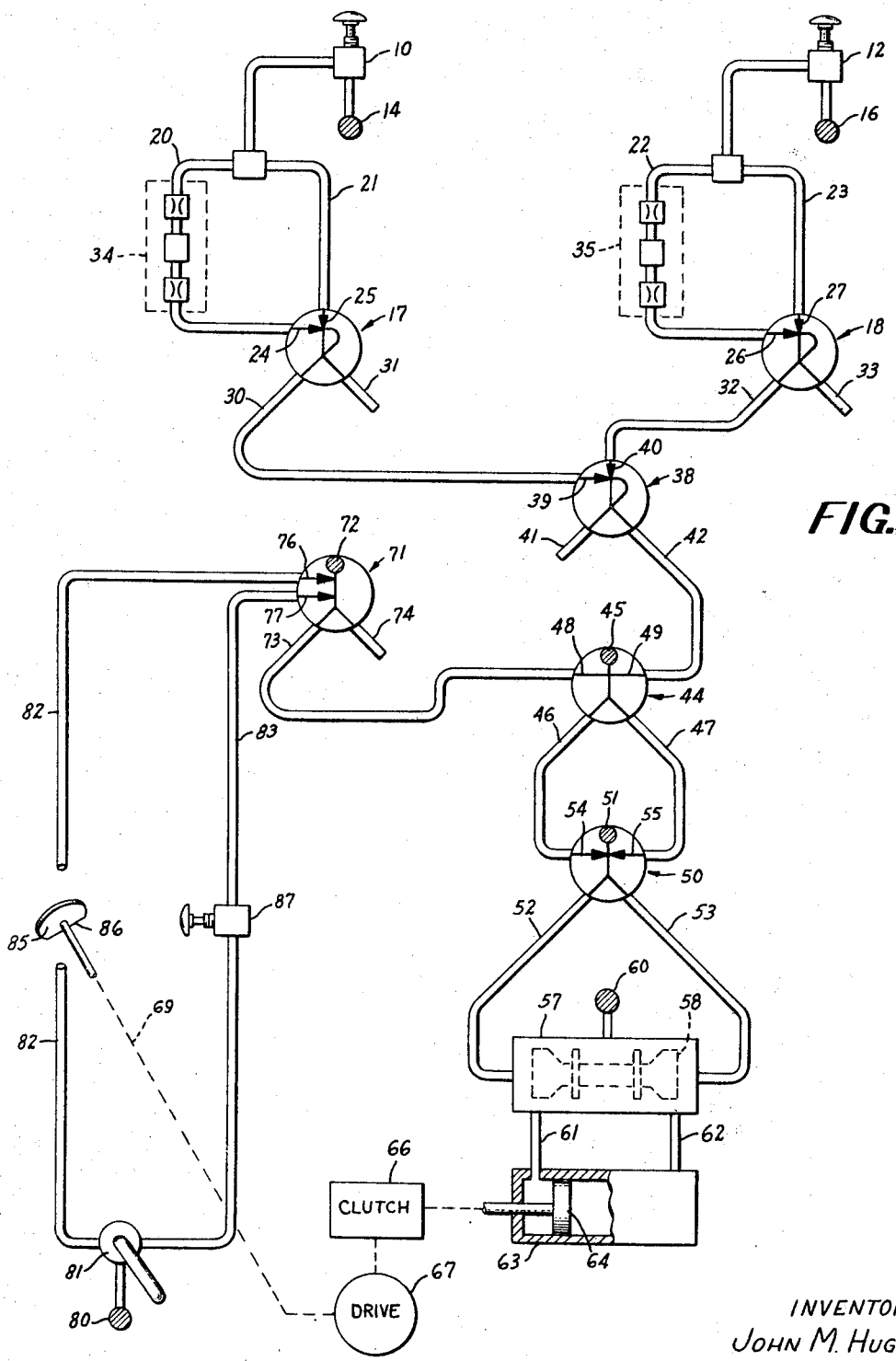

Referring now to the drawings there is illustrated in FIGURE 1 is a fluidic control sysstem including a pair of manually actuatable control means 10 and 12 of any suitable form for controlling the supply of fluid from suitable pressure fluid sources 14 and 16 to a pair of fluid amplifiers 17 and 18 through suitable fluid conducting paths. The control means 10 and 12 are preferably in the form of spring-biased, push-button operated valves which are normally closed when extended as shown to prevent fluid flow, and which are opened to supply fluid from the sources 14 and 16 to the fluid amplifiers 17 and 18 in response to depression thereof. Any suitable fluid may be employed in the system of FIGURE 1 such as air, water, etc.

The fluid conducting paths may be of any suitable form such as piping or enclosed channels, and comprise a first pair of parallel paths 20 and 21 associated with valve 10, and a second pair of parallel paths 22 and 23 associated with valve 12. The paths 20 and 21 are connected respectively to input passages 24 and 25 of amplifier 17, and the paths 22 and 23 are connected respectively to input passages 26 and 27 of amplifier 18.

The amplifiers 17 and 18 perform identical functions and may be of identical construction. Each of the amplifiers 17 and 18 in addition to having a pair of input passages also has a pair of output passages with the amplifier 17 having output passages 30 and 31 and the amplifier 18 having output passages 32 and 33. Each of the amplifiers 17 and 18 may be termed a half adder and is designed so that when fluid is applied to either one but not both of its input passages, fluid appears at one of its output passages, and when fluid is applied simultaneously to both of its input passages, fluid appears at the other of its output passages. For example, if fluid is applied to either of the input passages 24 and 25 of amplifier 17, such fluid will appear at output passage 30. However, if fluid is applied simultaneously to both passages 24 and 25, the fluid is diverted to appear at output passage 31. Operation of the amplifier 18 is identical to that of amplifier 17 and need not be described.

In order to delay arrival of fluid at one of the input passages of each of the amplifiers 17 and 18, the present invention provides that one of the conducting paths of each pair of conducting paths contains suitable fluid time delay means. In the embodiment illustrated in FIGURE 1, the paths 20 and 22 contain suitable time delay means 34 and 35 respectively. Such fluid time delay means may be of any suitable form, such as fluid resistors and fluid capacitors, sufficient to delay the application of fluid to the input passages 24 and 26 of amplifiers 17 and 18 a predetermined time after application of fluid to input passages 25 and 27 in response to depression of pushbutton valves 10 and 12.

In order to provide a fluid signal in response to fluid outputs appearing simultaneously at the output passages 30 and 32 of amplifiers 17 and 18, a third fluid amplifier 38 is provided similar in function to amplifiers 17 and 18 and having input passages 39 and 40 connected respectively to output passages 30 and 32 of amplifiers 17 and 18. Amplifier 38 includes output passages 41 and 42 and its design is such that fluid appears at passage 41 when either one but not both of passages 39 and 40 receives fluid. When both passages 39 and 40 receive fluid simultaneously, a fluid output appears at output passage 42. Therefore, fluid will appear at output passage 42 of amplifier 38 when fluid appears simultaneously at each of the output passages 30 and 32 of amplifiers 17 and 18. Passages 31, 33, and 41 of amplifiers 17, 18, and 38 are connected to drain to be either exhausted to atmosphere or returned to the sources 14 and 16 as desired.

In order to produce a fluid signal in response to fluid appearing at output passage 42 of amplifier 38, the invention provides a fourth fluid amplifier 44 of the boundary layer type exhibiting lock-on characteristics. The amplifier 44 may be designated a flip-flop amplifier and includes a source 45 of pressure fluid connected to a nozzle for issuing a fluid stream, and a pair of output passages 46 and 47 for intercepting the fluid stream. The amplifier 44 also includes a pair of control passages 48 and 49 disposed on opposite sides of the fluid stream to control the deflection thereof. The amplifier 44 may be of the type disclosed in FIGURE 6 of Patent 3,181,546 assigned to the assignee of the instant application. As described in Patent 3,181,546, a boundary layer amplifier is one in which the configuration of the two side walls which bound the fluid stream may be such as to establish boundary layer regions which cause the fluid stream to lock on to a first side wall in response to application of a suitable control signal to the control passage at the opopsite side of the fluid stream. The fluid stream remains locked on to the first side wall even after removal of the control signal which deflected the stream toward the first side wall. The stream can be deflected to the second side wall by application of a suitable control signal to the other control passage adjacent the first side wall.

By way of illustration, application of a control signal in the form of pressure fluid to the control passage 49 of amplifier 44 will result in deflection of the fluid stream to the opposite side wall wherein the stream becomes locked on to such side wall and emerges at the output passage 46. The stream will continue to emerge from the passage 46 even after the control signal is removed from passage 49. The stream can be deflected from passage 36 to passage 47 by application of a suitable control signal to control passage 48, and the stream will remain in such deflected condition after removal of the signal from passage 48.

In order to amplify the output signal from amplifier 44, a fluid amplifier 50 is provided which may be designated a digital amplifier and which includes a source 51 of pressure fluid connected to a nozzle for issuing a fluid stream, a pair of output passages 52 and 53 for intercepting the stream, and a pair of control passages 54 and 55 on opposite sides of the stream. The control passages 54 and 55 are connected respectively to the output passages 46 and 47 of amplifier 44. The amplifier 50 is a boundary layer device but does not exhibit lock-on characteristics and output fluid flows in one or the other of passages 52 and 53 only when a control fluid signal is applied to one or the other of the control passages 54 and 55. Thus, if control fluid is received by control passage 54 from output passage 46, the stream derived from the source 51 is deflected to emerge at output passage 53. However, if the control fluid is removed from passage 54, the stream is deflected so that it will not emerge from output passage 53.

In the embodiment shown in FIGURE 1, the output passages 52 and 53 of amplifier 50 are connected respectively to opposite ends of a cylinder 57 containing a shiftable valve 58 which controls passage of fluid from a source 60 of pressure fluid connected to cylinder 57 to a pair of output passages 61 and 62 connected between cylinder 57 and an additional cylinder 63 containing a piston 64. The arrangement is such that if fluid appears at output passage 53 of amplifier 50, the valve 58 is shifted toward the left as viewed in FIGURE 1 to permit fluid to flow from source 60 through output passage 62 and into cylinder 63 to shift the piston 64 toward the left as viewed in FIGURE 1. When fluid appears at output passage 52 of amplifier 50, the valve 58 is shifted toward the right as viewed in FIGURE 1 to permit fluid from source 60 to flow through output passage 61 into cylinder 63 to shift the piston 64 toward the right as viewed FIGURE 1.

In the present invention movements of the piston 64 are utilized to control operation of a suitable controlled device which may for example comprise a punch press. In the embodiment illustrated movement of the piston 64 toward the left in FIGURE 1 is employed to engage a rolling key clutch 66 for connecting a drive 67 which may be an electric motor for initiating rotation of the press crankshaft 69 to begin the press stroke.

Operation of the fluidic control system as thus far described will now be set forth. In order to initiate operation of the controlled device an operator simultaneously depresses the pushbutton valves 10 and 12 which as previously described results in the simultaneous appearance of fluid at the output passages 30 and 32 of amplifiers 17 and 18. Such fluid is simultaneously applied to input passages 39 and 40 of amplifier 38 resulting in a fluid output at output passage 42. Flip-flop amplifier 44 is designed so that in the absence of a control input to either of its control passages 48 and 49, the fluid stream from source 45 emerges at output passage 47. When fluid in passage 42 is applied to control passage 49, the stream from source 45 is deflected away from output passage 47 to output passage 46 from which it is supplied to control passage 54 of amplifier 50 to deflect its associated fluid stream to output passage 53. Fluid in passage 53 enters the cylinder 57 and shifts the valve 58 toward the left as viewed in FIGURE 1 so that fluid from source 60 emerges at output passage 62 to enter the cylinder 63 and shift the piston 64 toward the left to engage the clutch 66 which initiates the stroke of the punch press.

The above-described operations occur very rapidly and it is not necessary for the operator to maintain the valves 10 and 12 in depressed condition once the machine begins operation. Although release of the pushbutton valves 10 and 12 to their normally extended positions will terminate the flow of fluid from sources 14 and 16 to the amplifiers 17 and 18, the piston 64 will remain in its extended left hand position by reason of the lock-on characteristics of flip-flop amplifier 44 which maintains its fluid stream in a position to emerge from output passage 46 even after removal of control fluid from control passage 49 resulting from release of valves 10 and 12.

The controlled machine cannot be started in the event the operator depresses only a single one of the pushbutton valves 10 and 12. If the operator depresses only the valve 10 in an effort to start the machine, fluid emerges at the output passage 30 of amplifier 17 and is applied to input passage 39 of amplifier 38. However, no fluid appears at input passage 40 of amplifier 38 inasmuch as valve 12 is not depressed. Therefore, fluid emerges at passage 41 connected to drain and no fluid is applied to control passage 49 of amplifier 44 with the result that the piston 64 remains in its right hand position.

In order to terminate operation of the controlled machine the present invention provides means for applying a fluid control signal to the passage 48 of flip-flop amplifier 44 to deflect the associated fluid stream for retracting the piston 64 to disengage the clutch 66. The terminating fluid control signal may be applied to amplifier 44 in any suitable manner either automatically in response to some condition or manually at the desire of the operator. In the embodiment illustrated in FIGURE 1, means are provided to automatically apply a terminating fluid control signal to terminate operation of the machine after one full cycle of operation thereof.

In the illustrated embodiment of FIGURE 1 the terminating fluid control signal is provided by an additional fluid amplifier 71 which includes a source 72 of pressure fluid connected to a nozzle for issuing a fluid stream toward a pair of output passages 73 and 74. The amplifier 71 further includes a pair of control passages 76 and 77 located on the same side of the fluid stream for controlling deflection of the stream. The amplifier 71 is designed such that by boundary layer effects therein, the stream normally emerges from the output passage 73 in the absence of application of control signals to either one or the other of the control passages 76 and 77. When control fluid is applied to either one or the other of the control passages 76 and 77, the fluid stream is deflected away from the passage 73 to the passage 74 which is connected to drain to be either exhausted to atmosphere or returned to one of the pressure fluid sources. The passage 73 is connected to the control passage 48 of amplifier 44. Control fluid is normally supplied to a selected one of the control passages 76 and 77 from a source 80 of pressure fluid under control of a manually operated selector switch 81 having both a "single cycle" position and a "continuous cycle" position.

With the switch 81 in its "single cycle" position, fluid is normally supplied from source 80 through a passage 82 to control passage 76. With switch 81 in its "continuous cycle" position, fluid is normally supplied from source 80 through a passage 83 to control passage 77. In order to automatically interrupt fluid flow in passage 82 to thereby apply a fluid control signal to passage 48 of amplifier 44, a segmented cam 85 is affixed to the crankshaft 69 for rotation therewith, and is positioned in an interrupted section of passage 82.

The arrangement is such that when the press is in its top position, a flat side 86 of the cam 85 is positioned to permit fluid flow in the passage 82 to the control passage 76. After the piston 64 has been extended and the crankshaft 69 has rotated a predetermined amount, the full circular portion of cam 85 will interrupt fluid flow in passage 82 so that the power stream of amplifier 71 is diverted by boundary layer effect to passage 73. The fluid control signal applied to passage 48 from passage 73 is effective to deflect the fluid stream in amplifier 44 away from passage 46 to passage 47, which results in the shifting of piston 64 toward the right as viewed in FIGURE 1. The clutch 66 permits stopping of the press only in the top position so that the flat side 86 of cam 85 is properly positioned to permit fluid flow in passage 82.

If it is desired to permit continuous operation of the press and to terminate the continuous operation manually, the selector switch 81 is placed in its "continuous cycle" position wherein fluid normally flows from source 80 through passage 83. Flow of fluid through passage 83 is controlled by a manually operable, spring biased pushbutton valve 87 which when extended normally permits fluid flow through passage 83, and which when depressed by an operator, prevents fluid flow through passage 83. Thus, when an operator wishes to stop the punch press, he merely depresses valve 87 to interrupt fluid flow through passage 83, which results in the fluid stream of amplifier 71 emerging at passage 73 and being applied to passage 48. The piston 64 is thereby shifted toward the right as viewed in FIGURE 1 and the press will stop at its top position.

Figure 2:
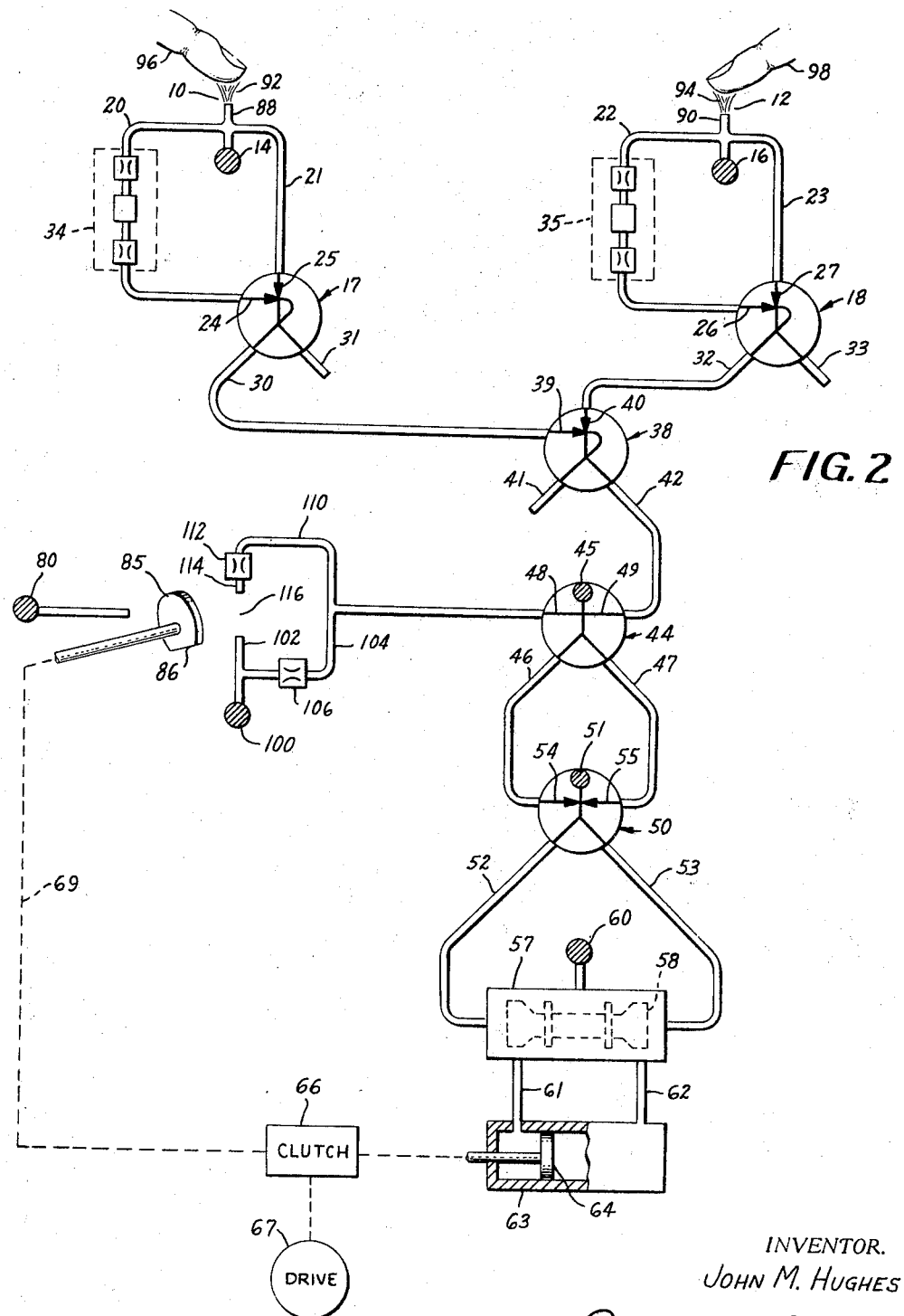
FIGURE 2 is a schematic diagram illustrating embodiment of the invention different from the embodiment of FIGURE 1.

Referring now to FIGURE 2 there is illustrated a different embodiment of the invention, involving modifications in the design of the control means 10 and 12 of the system of FIGURE 1, and also the means for applying the termination signal to the amplifier 44 of FIGURE 1. Components in the system of FIGURE 2 which correspond to like components in the system of FIGURE 1 are represented by the same reference numerals.

The control means 10 and 12 in the embodiment shown in FIGURE 2 are supplied with fluid from pressure fluid sources 14 and 16 respectively. Each control means includes a passageway having three outlets. In control means 10 one of these outlets is formed as a nozzle 88 through which fluid may escape as shown at 92. Similarly in control means 12, one of the outlets is formed as a nozzle 90 through which fluid may escape as shown at 94. The other two outlets of control means 10 are connected to parallel paths 20 and 21, and the other two outlets of control means 12 are connected to parallel paths 22 and 23. Essentially all of the fluid provided by the pressure fluid sources 14 and 16 escapes through the nozzles 88 and 90 respectively, such that an unappreciable amount of fluid is supplied to the parallel paths. Therefore, there are no outputs from fluid amplifiers 17 and 18.

In the embodiment shown in FIGURE 1, fluid is provided to parallel passages 20 and 21 by depressing pushbutton operated valve 10 and to parallel passages 22 and 23 by depressing pushbutton operated valve 12. In the embodiment shown in FIGURE 2, fluid is provided to parallel passages 20 and 21 by blocking nozzle 88 by an object, such as a finger 96, and to parallel passages 22 and 23 by blocking nozzle 90 by an object, such as a finger 98. Simultaneous blocking of nozzles 88 and 90 by fingers 96 and 98 respectively will cause the actuation of the piston 64 toward the left as previously described with respect to the embodiment shown in FIGURE 1.

The means for applying a termination signal to the amplifier 44 in the embodiment revealed in FIGURE 2 includes a pressure fluid source 80, and a segmented cam 85 driven by crankshaft 69, as in the embodiment shown in FIGURE 1. A pressure fluid source 100 provides fluid to passageway 102, formed as a nozzle, and to passageway 104, which includes a fluid resistor 106. Passageway 104 is connected by a passageway 108 to control passage 48 of flip-flop amplifier 44, and by a passageway 110 which includes a fluid resistor 112 to a nozzle 114. Nozzles 102 and 114 are in alignment with each other, such that absent any deflecting force in the region 116 between them, the fluid emitted from nozzle 102 enters nozzle 114.

As set forth with respect to the embodiment shown in FIGURE 1, when the press is in its top position, flat side 86 of the cam 85 is positioned to permit fluid flow from the source 80 into the region 116 perpendicular to the axes of nozzles 102 and 114. With the press in its top position, the fluid emitted from nozzle 102 is deflected away from nozzle 114 by the fluid emitted from pressure fluid source 80. Fluid also flows from pressure fluid source 100 through passageways 104 and 110, to nozzle 114, wherein it also is deflected from region 116 by the fluid emitted from pressure fluid source 80. Thus, with the press in its top position, fluid flowing from passageway 104 finds little resistance in passageway 110, and primarily flows therethrough, whereby fluid does not flow through passageway 108 to control passage 48. After piston 64 has been extended and the crankshaft 69 rotated a predetermined amount, the full circular portion of cam 85 will interrupt fluid flow from pressure fluid source 80 into the region 116. With fluid flow from source 80 blocked, fluid will flow from pressure fluid source 100 through nozzle 102 into nozzle 114. This fluid flow will increase the fluid pressure in passageway 110 so as to cause fluid flow through passageway 108 to control passage 48 of flip-flop amplifier 44. As previously discussed with respect to the embodiment shown in FIGURE 1, the fluid control signal applied to passage 48 from passage 108 is effective to deflect the fluid stream in amplifier 44 away from passage 46 to passage 47, which results in the shifting of piston 64 toward the right as viewed in FIGURE 2.

While the components of the control means 10 and 12 set forth in the second embodiment are less expensive than the components of the control means set forth in the first embodiment, the cost of operation of the fluidic control system set forth in the second embodiment is more expensive, in that pressure fluid is continually being vented to the atmosphere through nozzles 88 and 90. The fluid flows through nozzles 88 and 90 may also produce undesirable hissing noises. In the first embodiment wherein pushbutton operated valves form the control means 10 and 12, fluid flow from the pressure fluid source is conserved. Similarly, the means for providing the termination signal in the second embodiment is much less costly in that only two fluid resistors 106 and 112 are needed in place of the considerably more expensive fluid amplifier 71 in the first embodiment. But the use of the fluid amplifier in the first embodiment provides desirable operating advantages.

Figure 3:
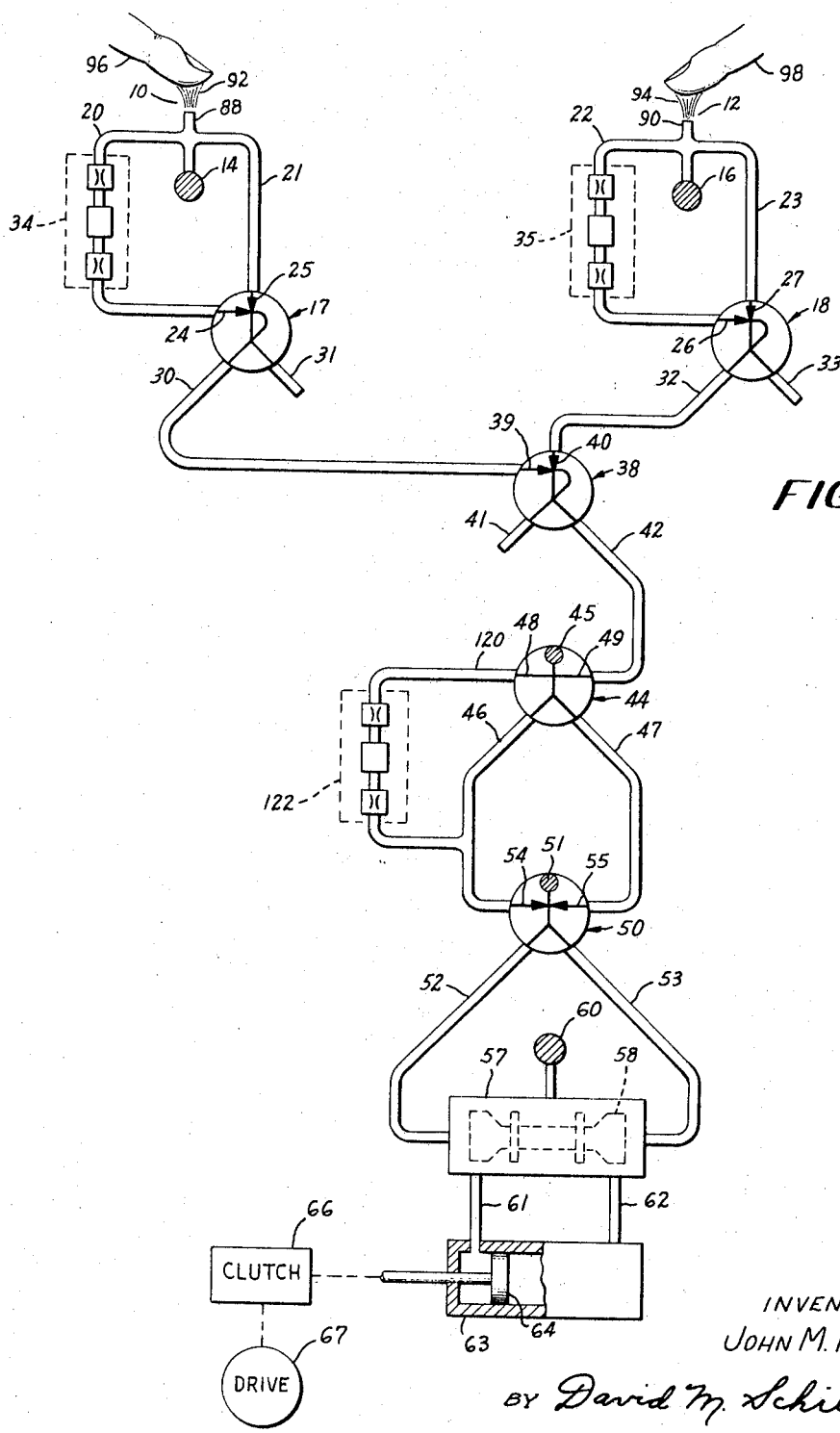
FIGURE 3 is a schematic diagram illustrating a modification of the embodiment of the invention shown in FIGURE 2.

In FIGURE 3, the embodiment of the invention shown in FIGURE 2 is modified to provide automatic reset of the flip-flop amplifier 44, and return of piston 64 to the right as viewed in FIGURES 1 through 3. Components of the modified system illustrated in FIGURE 3 which correspond to like components in the system of FIGURE 2 are represented by the same reference numerals.

As previously described with respect to the embodiment shown in FIGURE 2, simultaneous blocking of nozzles 88 and 90 will cause fluid to be provided to parallel paths 20 and 21, 22 and 23. Further, as previously set forth in the discussion of the embodiment shown in FIGURE 1, simultaneous supplying of fluid to the two pairs of parallel paths results in a fluid flow to control passage 49 of flip-flop amplifier 44. The stream from source 45 in flip-flop amplifier 44 is deflected away from output passage 47 to output passage 46, by the fluid flow to control passage 49. As previously described, piston 64 is shifted to the left as a result of fluid flow from output passage 46. A portion of the fluid flow in output passage 46 is fed back through a fluid conducting path 120, which includes a time delay means 122, to control passage 48 of amplifier 44. After a time delay provided by time delay means 122, a fluid flow will appear at control passage 48. The fluid flow at control passage 48 will deflect the fluid stream in amplifier 44 away from output passage 47 to output passage 47, and the piston 64 will be shifted toward the right as viewed in FIGURE 3. Thus, each time the piston 64 is moved to the left by simultaneous blocking of nozzles 88 and 90, it is automatically returned to the right after a time delay provided by time delay means 122.

Referring to FIGURE 1, FIGURE 2, or FIGURE 3, that portion of the fluidic control system comprising the control means 10, pressure fluid source 14, parallel paths 20 and 21, and fluid amplifier 17, has utility in many applications apart from the complete fluidic control system shown in FIGURES 1, 2, and 3 as a means for providing a momentary output in response to a temporary or sustained input. This sub-combination of the overall fluidic control system will be briefly reviewed by making reference to FIGURE 1 and in particular to control means 10, parallel paths 20 and 21, and fluid amplifier 17. The sub-combination is duplicated by control means 12, parallel paths 22 and 23, and fluid amplifier 18 in FIGURE 1, and by the similar components in FIGURES 2 and 3. Depression of the operator of pushbutton operated valve 10 supplies fluid to parallel paths 20 and 21 from pressure fluid source 14. Immediately upon the supplying of fluid to parallel paths 20 and 21, fluid is also supplied to input passage 25 of amplifier 17 through path 21. The supply of fluid to input passage 24 through parallel path 20 is delayed until later by time delay means 34. As previously set forth in describing the operation of the fluidic control system, the application of fluid to only one of the inputs of amplifier 17 results in a fluid output at output passage 30. The fluid output from output passage 30 will continue until valve 10 is closed, or until fluid is supplied to input passage 24 through the time delay means 34 in parallel passage 20. When fluid is supplied to input passage 24, the combined inputs of passages 24 and 25 will result in a fluid output at output passage 31. Thus, a momentary fluid output is provided at output passage 30 when the pushbutton operated valve 10 is opened for any period of time, whether it be a momentary or temporary opening, or a sustained opening. If valve 10 is opened for a shorter period of time than that provided by time delay means 34, the momentary fluid output from output passage 30 will be for the same length of time as the valve 10 is open. If the valve 10 is open for a longer period of time than the delay provided by time delay means 34, the momentary output from output passage 30 will be for a period of time corresponding to the delay provided by the time delay means 34.

I claim:
1. A fluidic control system comprising in combination, first and second actuatable control means for independently controlling supply of fluid from a source of pressure fluid, first, second, and third fluid amplifiers each including a pair of fluid input passages and a pair of fluid output passages, a first pair of fluid conducting paths connected in parallel between said first control means and the input passages of said first fluid amplifier, a second pair of fluid conducting paths connected in parallel between said second control means and the input passages of said second fluid amplifier, fluid time delay means in one path of each pair of said pairs of paths, each of said first, second, and third fluid amplifiers being designed to provide fluid at a first one of its output passages when fluid appears at either one but not both of its input passages, and to provide fluid at a second one of its output passages when fluid appears at both of its input passages, the input passages of said third fluid amplifier being connected respectively to said first output passages of said first and second fluid amplifiers, and means responsive to fluid appearing at said second output passage of said third fluid amplifier resulting from substantially simultaneous actuation of said first and second control means for effecting a controlling function.

2. A control system as defined in claim 1 wherein said second output passage of each of said first and second fluid amplifiers, and said first output passage of said third amplifier are connected to drain.

3. A control system as defined in claim 1 in combination with means operable automatically a predetermined time after response by said means responsive to operate said means responsive for terminating said controlling function.

4. A control system as defined in claim 1 wherein said first and second control means each includes a spring biased manually actuatable pushbutton valve, said valves being normally closed to prevent flow of fluid from said source to the associated parallel fluid conducting paths, said valves when opened in response to manual actuation thereof permitting flow of fluid from said source to the associated parallel fluid conducting paths.

5. A control system as defined in claim 1 wherein said first and second control means each includes a nozzle connected to the associated parallel fluid conducting paths so as normally to vent fluid from said source away from the associated fluid conducting paths, the blocking of said nozzles preventing the venting of fluid from said source and permitting fluid flow from said source to the associated parallel fluid conducting paths.

6. A control system as defined in claim 1 wherein said last-name means includes a fourth fluid amplifier having a power nozzle to be connected to a source of pressure fluid for issuing a power stream, a pair of fluid output passages for receiving said power stream dependent upon its direction of flow, and a pair of control passages for controlling the direction of flow of said power stream, said second output passage of said third fluid amplifier being connected to one of said control passages of said fourth fluid amplifier, and means responsive to fluid appearing at said output passages of said fourth fluid amplifier for effecting a controlling function.

7. A control system as defined in claim 6 wherein said fourth fluid amplifier is a boundary layer amplifier with lock-on effects.

8. A control system as defined in claim 6 wherein said last-name means includes a valve shiftable in opposite directions in response to fluid appearing at said output passages of said fourth fluid amplifier for controlling flow of a pressure fluid, said valve shifting in a direction determined by the direction of flow of the power stream of said fourth fluid amplifier, a cylinder for receiving pressure fluid under control of said valve, and a piston movable in opposite directions within said cylinder in response to pressure fluid received by said cylinder, said piston moving in a direction determined by the direction of shift of said valve.

9. A control system as defined in claim 6 in combination with a fluid conducting path interconnecting a second of said control passages of said fourth fluid amplifier and a first of said output passages of said fourth fluid amplifier, said path including a time delay means, said second output passage of said third fluid amplifier connected to a first of said control passages of said fourth fluid amplifier, fluid appearing at said second output passage of said third fluid amplifier causing said power stream to emerge from said first output passage of said fourth fluid amplifier, a portion of said power stream emerging from said first output passage of said fourth fluid amplifier being supplied to said second control passage of said fourth fluid amplifier through said path, after a time delay provided by said fluid time delay means, to cause said power stream to emerge from a second of said output passages of said fourth fluid amplifier.

10. A fluidic control system comprising in combination, first and second actuatable control means for independently controlling supply of fluid from a source of pressure fluid, first, second, and third fluid amplifiers each including a pair of fluid input passages and a pair of fluid output passages, a first pair of fluid conducting paths connected between said first control means and the input passages of said first fluid amplifier, a second pair of fluid conducting paths connected between said second control means and the input passages of said second fluid amplifier, fluid time delay means in one path of each pair of said pairs of paths, each of said first, second, and third fluid amplifiers being designed to provide fluid at a first one of its output passages when fluid appears at either one but not both of its input passages, and to provide fluid at a second one of its output passages when fluid appears at both of its input passages, the input passages of said third fluid amplifier being connected respectively to said first output passages of said first and second fluid amplifiers, a fourth fluid amplifier having a power nozzle to be connected to a source of pressure fluid for issuing a power stream, a pair of fluid output passages for receiving said power stream dependent upon its direction of flow, and a pair of control passages for controlling the direction of flow of said power stream, said second output passage of said third fluid amplifier being connected to one of said control passages of said fourth fluid amplifier, a valve shiftable in opposite directions in response to fluid appearing at said output passages of said fourth fluid amplifier for controlling flow of a pressure fluid, said valve shifting in a direction determined by the direction of flow of the power stream of said fourth fluid amplifier, a cylinder for receiving pressure fluid under control of said valve, a piston movable in opposite directions within said cylinder in response to pressure fluid received by said cylinder, said piston moving in a direction determined by the direction of shift of said valve, a fifth fluid amplifier having a power nozzle to be connected to a source of pressure fluid for issuing a power stream, a pair of fluid output passages for receiving said power stream dependent upon its direction of flow, and a control passage for controlling the direction of flow of said power stream, one of said output passages of said fifth fluid amplifier being connected to the other of said control passages of said fourth fluid amplifier, and means operable a predetermined time after movement of said piston in a first direction to supply a signal to the control passage of said fifth fluid amplifier to direct its power stream to its said one output passage to thereby change the direction of the power stream of said fourth fluid amplifier and effect movement of said piston in a second direction opposite to said first direction.

References Cited

UNITED STATES PATENTS

| | | | |
|---|---|---|---|
| 3,124,999 | 3/1964 | Woodward | 137—81.5 XR |
| 3,185,166 | 5/1965 | Horton et al. | 137—81.5 |
| 3,191,611 | 6/1965 | Bauer | 137—81.5 |
| 3,266,510 | 8/1966 | Wadey | 137—81.5 |
| 3,285,265 | 11/1966 | Boothe et al. | 137—81.5 |
| 3,292,648 | 12/1966 | Colston | 137—81.5 XR |
| 3,338,515 | 8/1967 | Dexter | 137—81.5 XR |
| 3,350,008 | 10/1967 | Avery | 235—201 |

SAMUEL SCOTT, *Primary Examiner.*